US011955115B2

(12) United States Patent
Ball

(10) Patent No.: US 11,955,115 B2
(45) Date of Patent: Apr. 9, 2024

(54) SEMANTIC-BASED NLU PROCESSING SYSTEM BASED ON A BI-DIRECTIONAL LINKSET PATTERN MATCHING ACROSS LOGICAL LEVELS FOR MACHINE INTERFACE

(71) Applicant: Pat Inc., Palo Alto, CA (US)

(72) Inventor: John Ball, Santa Clara, CA (US)

(73) Assignee: Pat Inc., Palo Alto, CA (US)

(*) Notice: Subject to any disclaimer, the term of this patent is extended or adjusted under 35 U.S.C. 154(b) by 292 days.

(21) Appl. No.: 16/255,011

(22) Filed: Jan. 23, 2019

(65) Prior Publication Data

US 2019/0259379 A1 Aug. 22, 2019

Related U.S. Application Data

(63) Continuation-in-part of application No. 15/222,399, filed on Jul. 28, 2016, now abandoned.
(Continued)

(51) Int. Cl.
*G10L 15/18* (2013.01)
*G06F 40/30* (2020.01)
(Continued)

(52) U.S. Cl.
CPC .......... *G10L 15/1815* (2013.01); *G06F 40/30* (2020.01); *G10L 15/00* (2013.01); *G10L 15/22* (2013.01); *G10L 2015/223* (2013.01)

(58) Field of Classification Search
CPC ..... G10L 15/26; G10L 15/1815; G10L 15/22; G10L 2015/223; G10L 15/10;
(Continued)

(56) References Cited

U.S. PATENT DOCUMENTS 6,405,162 B1 * 6/2002 Segond ................ G06F 40/30
704/9
9,152,623 B2 * 10/2015 Wroczy ................ G06F 40/55
(Continued)

FOREIGN PATENT DOCUMENTS

WO WO-2015161338 A1 * 10/2015 ........... G06F 17/241

*Primary Examiner* — Angela A Armstrong
(74) *Attorney, Agent, or Firm* — Daylight Law, P.C.

(57) ABSTRACT

The invention concerns linguistic analysis. In particular the invention involves a method of operating a computer to perform linguistic analysis. In another aspect the invention is a computer system which implements the method, and in a further aspect the invention is software for programming a computer to perform the method. The semantic-based NLU input processing system based on a bi-directional linkset pattern matching across logical levels for machine interface comprises: a meaning matcher; a context engine; a generator; a processor coupled to a memory element with stored instructions, when implemented by the processor, cause: receiving at least a first input; applying a consolidation to convert symbols into words and words into phrase patterns, pattern match to convert phrase patterns into validated meanings; converting the validated meanings into a semantic representation by the meaning matcher; converting the semantic representation into a meaning response by the context engine; and finally, generating a targeted language response by the generator.

12 Claims, 19 Drawing Sheets

Related U.S. Application Data

(60) Provisional application No. 62/198,684, filed on Jul. 30, 2015.

(51) Int. Cl.
*G10L 15/00* (2013.01)
*G10L 15/22* (2006.01)

(58) Field of Classification Search
CPC ......... G10L 25/48; G10L 15/00; G10L 15/18; G06F 17/2705; G06F 17/2755; G06F 17/2775; G06F 17/2785; G06F 40/205; G06F 40/268; G06F 40/289; G06F 17/2715; G06F 17/2881; G06F 17/30743; G06F 40/30
See application file for complete search history.

(56) References Cited

U.S. PATENT DOCUMENTS

| | | | | |
|---|---|---|---|---|
| 2006/0235689 | A1* | 10/2006 | Sugihara | G10L 15/1822 704/257 |
| 2010/0030553 | A1* | 2/2010 | Ball | G06F 40/216 704/9 |
| 2012/0253793 | A1* | 10/2012 | Ghannam | G06F 16/3344 704/9 |
| 2014/0046967 | A1* | 2/2014 | Nash-Walker | G10L 15/10 707/754 |

* cited by examiner

Phrase

| Pattern List | Pattern 1 | Pattern 2 | Pattern 3 | Pattern 4 |
|---|---|---|---|---|
| Tags (Use) | Tag 1, Tag 2 | Tag 3, Tag 4 | Tag 5 | Tag 6, Tag 7 |
| Head | | | | X |

Attributes    Attribute 1, attribute 2, ...

Notes:
1. Each pattern is a set of elements including negative elements.
2. Tags identify phrase pattern purpose for subsequent use.
3. Attributes provide level detail amongst other purposes.

FIG. 1

| English –FIXED word order<br>The dog -bites -a mother.<br>ACTOR -VERB - UNDERGOER | Consolidation Set<br>(CS)<br>dog (definite, subject) mother (indefinite, object) bites (past simple tense) |
|---|---|
| German –FIXED verb, can swap order Der Hund -beißt -eine Mutter.<br>ACTOR -VERB –UNDERGOER<br>Eine Mutter -beißt -der Hund. UNDERGOER - VERB- | Hund (definite, nom) Mutter (indefinite, acc) beißt (past simple tense) |
| Japanese –FIXED verb, can swap order Kanojo-wa hon-o yomimasu.<br>ACTOR -UNDERGOER -VERB<br>Hon-o kanojo-wa yomimasu. UNDERGOER - ACTOR -VERB | kanojo (subject) hon (object) yomimasu (past simple tense) |

FIG. 3

SEMANTIC-BASED NLU PROCESSING SYSTEM BASED ON A BI-DIRECTIONAL LINKSET PATTERN MATCHING ACROSS LOGICAL LEVELS FOR MACHINE INTERFACE

CROSS-REFERENCE TO RELATED APPLICATION

This non-provisional patent application is a continuation-in-part application under 35 U.S.C. § 120 of U.S. patent application Ser. No. 15/222,399 for "Set-based Parsing for Computer-Implemented Linguistic Analysis", filed Jul. 28, 2016 which claims the benefit under 35 U.S.C. § 119(e) of U.S. Provisional Patent Application No. 62/198,684 for "Set-based Parsing for Linguistic Analysis", filed Jul. 30, 2015, the disclosure of which is incorporated herein by reference.

BACKGROUND OF THE INVENTION

A. Technical Field

This invention relates to the field of computer-implemented linguistic analysis for human language understanding and generation. More specifically, it relates to Natural Language Processing (NLP), Natural Language Understanding (NLU), Automatic Speech Recognition (ASR), Interactive Voice Response (IVR) and derived applications including Fully Automatic High Quality Machine Translation (FAHQMT). More specifically, it relates to a method for parsing language elements (matching sequences to assign context and structure) at many levels using a flexible pattern matching technique in which attributes are assigned to matched-patterns for accurate subsequent matching. In particular the invention involves a method of operating a computer to perform language understanding and generation. In another aspect the invention is a computer system which implements the method, and in a further aspect the invention is software for programming a computer to perform the method.

B. Description of Related Art

Today, many thousands of languages and dialects are spoken worldwide. Since computers were first constructed, attempts have been made to program them to understand human languages and provide translations between them.

While there has been limited success in some domains, general success is lacking. Systems made after the 1950s, mostly out of favor today, have been rules-based, in which programmers and analysts attempt to hand-code all possible rules necessary to identify correct results.

Most current work relies on statistical techniques to categorize sounds and language characters for words, grammar, and meaning identification. "Most likely" selections result in the accumulation of errors.

Parse trees have been used to track and describe aspects of grammar since the 1950s, but these trees do not generalize well between languages, nor do they deal well with discontinuities.

Today's ASR systems typically start with a conversion of audio content to a feature model in which features attempt to mimic the capabilities of the human ear and acoustic system. These features are then matched with stored models of phones to identify words, stored models of words in a vocabulary and stored models of word sequences to identify phrases, clauses and sentences.

Systems that use context frequently use the "bag of words" concept to determine the meaning of a sentence. Each word is considered based on its relationship to a previously analyzed corpora, and meaning determined on the basis of probability. The meaning changes easily by changing the source of the corpora.

No current system has yet produced reliable, human-level accuracy or capability in this field of related art. A current view is that human-level capability with NLP is likely around 2029, when sufficient computer processing capability is available.

SUMMARY OF THE INVENTION

An embodiment of the present invention provides a method in which complexity is recognized by combining patterns in a hierarchy. U.S. Pat. No. 8,600,736 B2, 2013 describes a method to analyze languages. The analysis starts with a list of words in a text: the matching method creates overphrases that representing the product of the best matches.

An embodiment of the present invention extends this overphrase to a Consolidation Set (CS), a set that consolidates previously matched patterns by embedding relevant details from the match and labelling them as needed. Matching of the initial elements or the consolidation set are equivalent. A CS can be thought of as labelling syntax for a language, which can subsequently be converted into a validated semantic representation. The CS and subsequent semantic representation, the Semantic Set (SS) are still just overphrases. Sets can vastly reduce the number of phrase patterns needed when compared with (a) rules that create trees and (b) the scale of statistics that track word sequence.

The CS enables more effective tracking of complex phrase patterns. To track these, a List Set (LS) stores all matched patterns—a list of sets of elements. As a CS is an element, matching and storing of patterns simply verifies if a matched pattern has previously been stored. Parsing completes when no new matches are stored in a full parse round—looking for matches in each element of the LS.

As each parse round completes with the validation of meaning for the phrase, clause or sentence, invalid parses can be discarded regardless of their correct grammatical use in other contexts with other words.

The matching and storing method comprises the steps of: receiving a matched phrase pattern with its associated sequence of elements. For each match, creating a new CS to store the full representation of the phrase as a new element. To migrate elements, the CS stores the union of its elements with the sets identified.

Once the CS is created, it is filled with information defined in the phrase. Phrases with a head migrate all words senses from the head to the CS. Headless phrases store a fixed sense stored in the phrase that provides necessary grammatical category and word sense information.

Logical levels are created by the addition of level attributes, which serve also to inhibit matches.

All attributes in the matched phrases are stored in the CS. The CS is linked to the matched sequence of elements. The CS receives a copy of the matched elements with any tags identified by the phrase. Once the CS is created and filled, it is ready to be matched with a phrase to resolve the semantic representation. The semantic phrase match invokes linkset intersection to effect Word Sense Disambiguation (WSD) along with the predicate's argument validation, resulting in a semantic set (SS).

The resulting elements may be selected to identify the best fit, enabling effective WBI (Word boundary identification) and PBI (Phrase boundary identification). The bidirectional nature of elements enables phrase generation.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which:

FIG. 1 shows a phrase structure in which the sequence of patterns are allocated values to enable future tracking, and the resulting CS (Consolidation Set) receives attributes used for element level identification and inhibition.

FIG. 3 shows an example of three languages, some of which allow word order variation but which provide a single CS (set) representation, ready for conversion to a semantic representation independently to the source language.

DETAILED DESCRIPTION OF EMBODIMENTS

Figure 2:
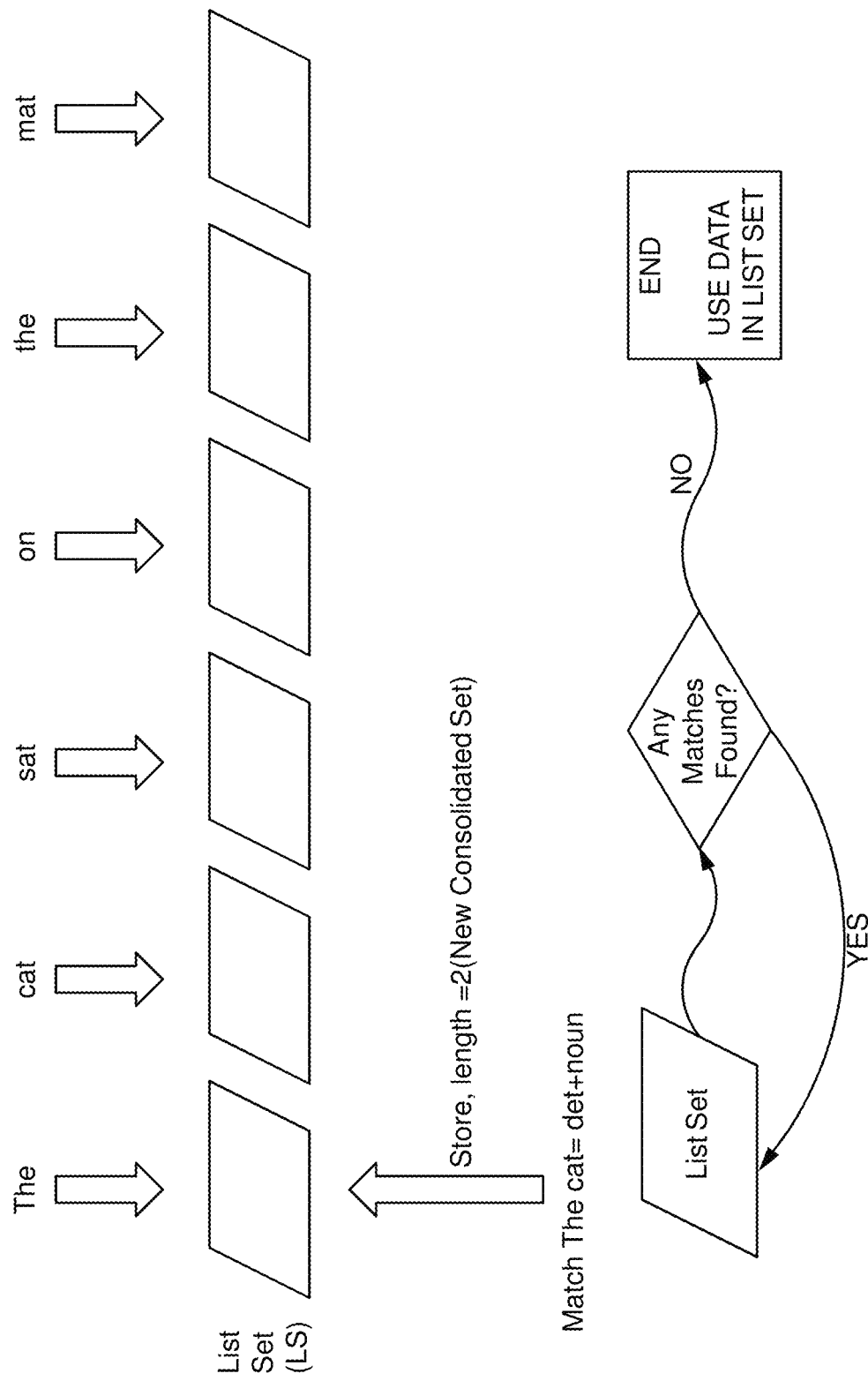
FIG. 2 illustrates an LS (List of Sets) used to control a parse of elements.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

An embodiment of the present invention provides a computer-implemented method in which complexity is built up by combining patterns in a hierarchy. U.S. Pat. No. 8,600,736 B2, 2013 describes a method to analyze language in which an overphrase, representing a matched phrase, is the product of a match. An embodiment of the present invention extends this overphrase to a Consolidation Set (CS), a data-structure set that consolidates previously matched patterns by embedding relevant details from the match and labelling them as needed. Matching automatically either initial elements or a consolidation set are equivalent. It also extends the patent as follows: instead of the analysis starting with a list of words in a text: the automatic matching method applies to elements that are sound features; written characters, letters or symbols; phrases representing a collection of elements (including noun phrases); clauses; sentences; stories (collections of sentences); or others. It removes the reliance on the 'Miss snapshot pattern' and 'phrase pattern inhibition' as the identification of the patterns is dealt with automatically when no more patterns are found.

A CS data structure links electronically to its matched patterns and automatically tags a copy of them from the matching phrase for further classification. It can re-structurally convert one or more elements to create a new set. Sets either retain a head element specified by the matching phrase or are structurally assigned a new head element to provide the CS with a meaning retained from the previous match, if desired.

Elements in the system modifiably decompose to either sets or lists. For written words in a language for example, they are transformationally represented as the list of characters or symbols, plus a set of word meanings and a set of attributes. For spoken words, these are a list of sound features, instead of characters. Pattern levels structurally separate the specific lists from their representations.

At a low level, a word data structure is a set of sequential lists of sounds and letters. Once matched, this data structure becomes a collection of sets containing specific attributes and other properties, like parts of speech. For an inflected language, for example, a word data structure is comprised structurally of its core meanings, plus a set of attributes used as markers. In Japanese, markers include particles like 'ga' that attach to a word; and in German articles like 'der' and 'die' mark the noun phrase. The electronic detection of patterns (such as particles) that automatically perform a specific purpose are embodied structurally as attributes at that level. To further illustrate the point, amongst other things, 'der' represents masculine, subject, definite elements—a set of attributes supporting language understanding.

Discontinuities in patterns and free word order languages which mark word uses by inflections are dealt automatically with in two steps. First, the elements are added structurally to a CS with the addition of attributes electronically to tag the elements for subsequent use. Second, the CS is matched structurally to a new level that automatically allocates the elements based on their marking to the appropriate phrase elements. While a CS data structure is stored in a single location, its length can span one or more input elements and it therefore structurally represents the conversion of a list to a set.

There is no limit to the number of attributes physically transformable in the system. Time may show that the finite number of attributes required is relatively small with data structure attribute sets creating flexibility as multiple languages are supported. To make use of the attribute accumulation for multi-level matching, pattern matching steps are repeated until there are no new matches found.

This invention may be implemented using an object-oriented (OO) programming language such that the relationships between a word and its grammar use words, that is words describing the grammatical usage of the word; phrases; and attributes are encapsulated by links within the word object.

This invention may be implemented in computer-based devices such as servers, personal computers, laptops, mobile phones and personal digital assistants (PDAs).

This invention is able to perform linguistic analysis on text written in various languages. It requires no distinction between the meaning of language symbols (letters, digits, punctuation), words, phrases and clauses. Advantageously, this invention can distinguish accurately between the uses of idiom, metaphor, proverbs, literal and titles; and between different senses of words.

This invention also treats different levels of language equally. Although the grammatical patterns determining meaning may differ, the principles used to achieve the goal of matching into phrases, clauses and sentences remains unchanged. Morphemes, which are words or word elements that cannot be divided into smaller meaningful parts, in one language can contain information stored in separate words in another. Words omitted in some languages are implied during the translation process by being included in the phrase pattern.

In addition, this invention has been devised to utilise existing computer technology in a new way. Today, most computer programs are written such that the program controls the operational flow and tend to use words as the principle source of meaning with word proximity used to help determine word sense disambiguation. In this invention, the data in the system controls the operation while the program's role is primarily to facilitate the data flow and to interface with Input or Output (I/O) functions like screen display and external interface formatting.

In another aspect the invention is a computer system which implements the method. In a further aspect the invention is software for programming a computer to perform the method.

FIG. 1 shows the structured elements of a phrase. A matched phrase automatically returns a new, filled CS. The phrase's pattern list is comprised of a list of structured patterns. Each pattern is a set of data structure elements. When a pattern list is matched structurally, a copy of each element matched is stored automatically with the corresponding data structure tags to identify previous elements for future use. The head of the phrase structurally identifies the pattern lists' word senses to retain if present, or a fixed sense is identified otherwise. For level tracking, phrase attributes are added automatically to the CS.

The computer-implemented method comprises the software-automated steps of: electronically receiving a matched phrase pattern data structure with its associated sequence of data structure elements. For each match, electronically creating a new CS data structure to store the full representation of the phrase transformatively as a new data structure element. The CS data structure automatically stores the union of its data structure elements with the data structure sets identified electronically to migrate elements.

Once the CS data structure is created electronically, it is filled automatically with information data structure defined in the phrase. Phrases with a head migrate transformatively all word senses from the head element to the CS data structure. Headless phrases structurally store a fixed sense stored structurally in the phrase data structure to provide any necessary grammatical category and word sense information. The CS data structure is linked electronically to the sequence of data structure elements matched and also filled automatically with a copy of them with any data structure tags modifiably identified by the phrase. Linkset intersection automatically is invoked for the data structure phrase to effect WSD once the CS has been filled automatically. By only intersecting data structure copies of the tagged data structure elements, no corruption of stored patterns from the actual match is possible.

FIG. 2 illustrates a List Set (LS), a list of sets of data structure elements, used to track and control automatically a parse of data structure elements regardless of the element type or level. Received data structure elements are loaded electronically into an LS of the same length, and then the LS enables automatic pattern matching until no new matches are stored electronically. A new CS data structure is stored electronically where the phrase match begins structurally in the LS, with a length used automatically to identify where a phrase's next data structure element is in the LS. As the LS stores sets electronically, a new CS data structure is only added automatically if an equivalent CS isn't already stored. FIG. 2 also shows a computer-implemented method to determine automatically an end-point: the automated process stops when there are no new structural matches generated in a full match round. All stored patterns in the LS are candidates for automated matching in the system. The best choice may be assumed automatically to be the longest valid phrase that structurally incorporates the entire input text, or the set of these when ambiguous. Embedded clause elements structurally provide valid information and may be automatically used if the entire match is unsuccessful, to enable automated clarification of partial information as a "word/phrase boundary identification" benefit.

FIG. 3 shows a Consolidation Set comparison for languages with structurally different phrase sequence patterns for active voices. In English, there is one word order which defines the subject, object and verb. In German, the marking of the nouns by determiners specifies the role used with the verb. In traditional parse trees, these structurally represent two different trees, however there is only one Consolidation Set, shown in column 2 each with only 3 elements. Similarly in Japanese, the marking of the nouns determines the relationship to the verb, but structurally there are also two possible parse trees, and only one Consolidation Set. Other syntactic structures may add additional data structure attributes, such as with passive constructions which use a different linking pattern per the RRG linking algorithm, but retaining structurally the same three tagged CS elements with their word-senses.

The FIG. 3 illustration shows subject, object, acc and nom tags to identify to the CS structurally the markings of the tagged, embedded data structure elements. For efficiency and the avoidance of a combinatorial explosion of phrase patterns, more data structure granularity is desirable for non-clause level phrases prior to promotion to a clause level match. The clause level tags are readily mapped electronically from phrase-level tags, because nominal and subject marking can be addressed synonymously for active voice clauses.

The data structure hierarchy is made flexible by the addition of appropriate attributes that are assigned automatically at a match in one level to be used in another: creating multi-layer structures that electronically separate linguistic data structure components for effective re-use. Parsing automatically from sequences to structure uses pattern layers, logically created automatically with data structure attributes. While one layer can automatically consolidate a sequence into a data structure set, another can allocate the set to new roles transformatively as is beneficial to non-English languages with more flexible word orders. The attributes also operate structurally as limiters automatically to stop repeated matching between levels—an attribute will inhibit the repeat matching by structurally creating a logical level. The creation of structured levels allows multiple levels to match electronically within the same environment.

Attributes are intended to be created automatically only once and reused as needed. Attributes existing once per system supports efficient structural search for matches. There is no limit on the number allowed structurally. To expand an attribute, it is added structurally to a set of data structure attributes. These data structure sets act like attributes, matched and used electronically as a collection. For example, the attribute "present tense" can be added structurally with the attribute "English" to create transformatively an equivalent attribute "present tense English".

While there are no limitations for specific language implementations, data structure tags electronically capture details about structurally embedded phrases for future use and attributes provide CS-level controls automatically to inhibit or enable future phrase matches. Attributes are used in particular to facilitate CS levels structurally where non-clauses are dealt with independently from clauses within the same matching environment. For example, this allows noun-headed clauses to be re-used automatically as nouns in other noun-headed clauses while electronically retaining all other clause level properties and clause-level WSD.

Figure 4:
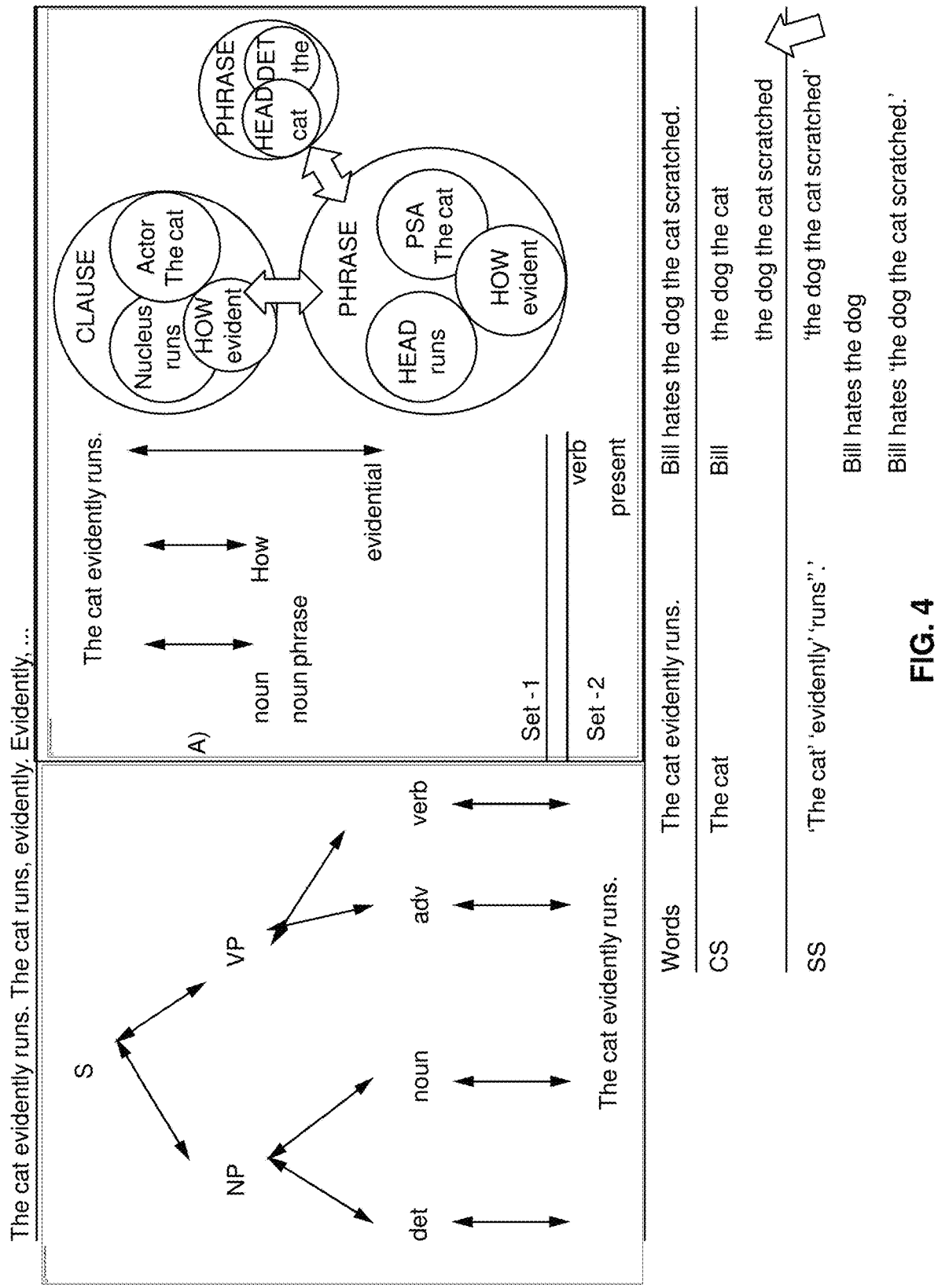
FIG. 4 shows a Consolidation Set within a meaning matching sequence, compared with a parse tree. The phrase elements are CSes, while the 'clause' migrates the CS into a semantic representation, a Semantic Set (SS). The grammatical term, clause, is used instead of the semantic term, proposition, for consistency with the current art's terminology, focused on syntax, not semantics. The typical matching process results in the creation of both CS and SS elements.

FIG. 4 shows a CS data structure compared with a parse tree. Since the 1950s, most linguistic models utilize parse trees to show phrase structure. To avoid the limitations of that model due to lack of addressability of nodes, proximity limitations and complexity due to the scale of embedded elements, the CS data structure is used automatically to provide electronic equivalence with greater transformative flexibility. Given the sample texts: "The cat evidently runs. The cat runs evidently.". Parse trees are created structurally for each sentence with the challenge of automatically determining the correct parts of speech, followed structurally by the correct meanings in the sentence, and then semantic and contextual representation can be attempted. By contrast, CS s form structurally from matched patterns. Elements are added structurally to the consolidation set as they are received, with ambiguous phrases being added automatically to different sets. In one embodiment, elements are added structurally to the CS by marking attributes electronically to tag the elements for subsequent use. A data structure phrase becomes ambiguous automatically when it is matched by more than one stored phrase pattern (sequence). Note that set1 and set2 are stored as the words are received, rather than being fitted structurally to a tree structure. During the automatic matching of patterns, WSD limits meanings to those that structurally fit the matched data structure pattern. For languages with free word orders in particular, the Consolidation Set approach seen in an embodiment of the present invention transformatively reduces the combinatorial explosion of possible matches significantly, while increasing accuracy as matched patterns are re-used, free of invalid possibilities through WSD. After a consolidated data structure set is structurally compiled, it can be promoted transformatively to a higher structural level at which point data structure elements are allocated automatically, such as from a collection of phrases to a clause. The diagram illustrates three CS data structure elements in which a noun phrase level matches 'the cat', another verb phrase level matches 'the cat runs evidently' and the clause level match shows the tagged nucleus 'runs' along with its tagged actor and how element.

Levels are allocated structurally based on the electronic inclusion of data structure attributes that automatically identify the layer singly or in combination with others. While a parse tree identifies its structure automatically through the electronic matching of tokens to grammatical patterns with recursion as needed, a phrase pattern matches more detailed data structure elements and assigns them structurally to levels. This structurally enables the re-use of phrases at multiple levels by repetitive matching, not recursion. In the example texts, structural levels are seen. 'The cat' is a phrase that must be matched before the clause. Similarly, 'the dog', 'the cat' and 'Bill' must be matched first structurally. With the embedded clause, 'the dog the cat scratched' must be matched first as a clause and then re-used with its head noun structurally to complete the clause.

An embodiment of the present invention describes the automatic conversion transformatively between sequential data structure patterns and equivalent data structure sets and back again. As a result, it removes the need for a parse tree and replaces it automatically with a CS data structure for recognition (a CS data structure consolidates all elements of the matched phrase in a way that enables bidirectional generation of the phrase electronically while retaining each constituent for use). As a CS data structure is equivalent to a phrase data structure, the structural embedding of CSs is equivalent to embedding complex phrases. For generation it uses a filled CS data structure, just matched or created, and generates the sequential version automatically. As the set embeds other patterns structurally, the ability for potentially infinite complexity with embedded phrases is available.

Figure 5:
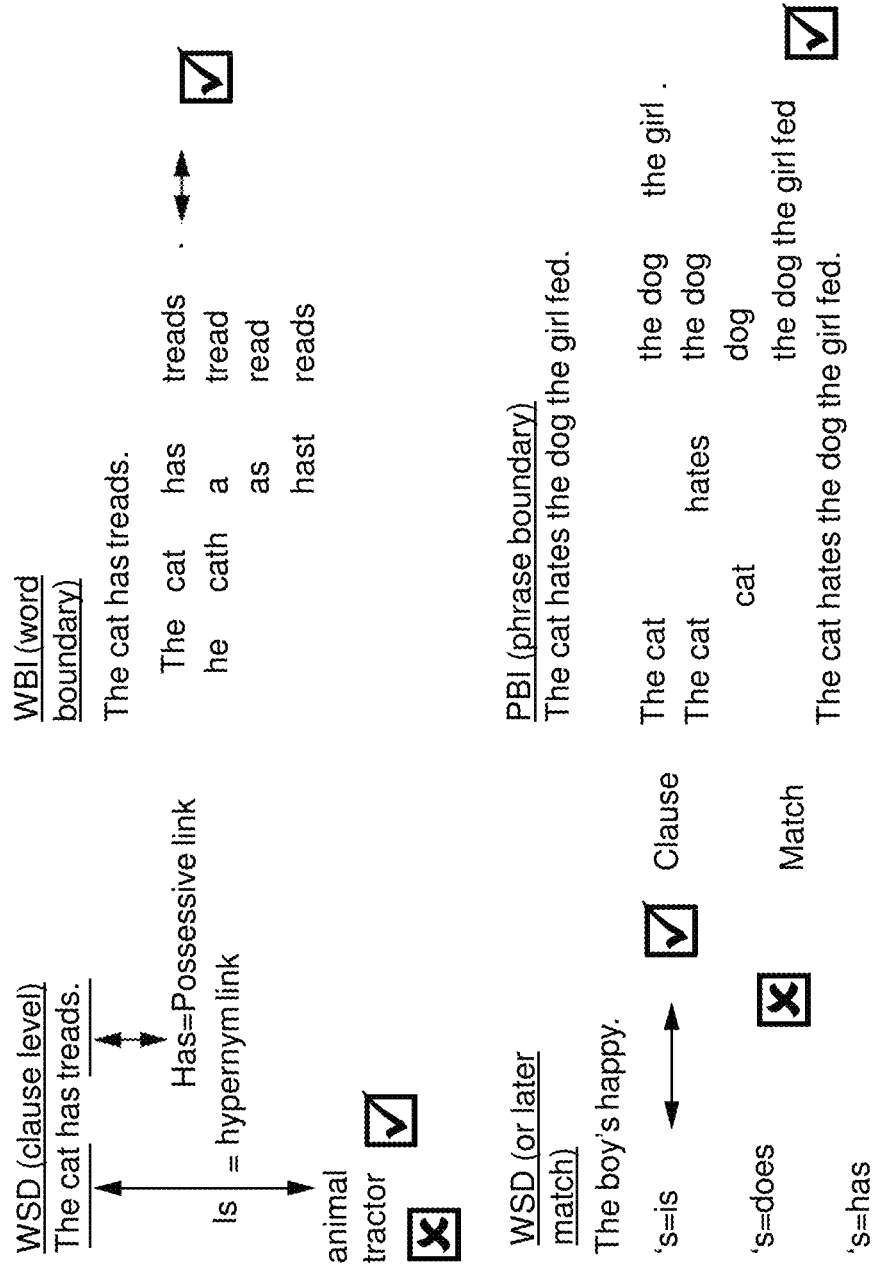
FIG. 5 explains 4 scenarios in which WSD, WBI and PBI are solved by an embodiment of the present invention.

FIG. 5 shows examples of solutions to WSD, WBI and PBI. WBI results from the automatic recognition of word constituents structurally at one level. These are disambiguated at a higher structural level. Similarly PBI is resolved the same way, automatically by matching potential phrases at one level and resolving them by their incorporation into a higher structural level. As data structure patterns are matched from whatever point they start, they are effectively matched independently of sequence at another structural level—the level at which meaning results from the combination of these patterns. Selecting elements in the LS automatically to identify the best fit, results in effective WBI and PBI. The bidirectional nature of elements enables phrase generation.

In the first example, 'the cat has treads' has the meaning of the word 'cat' disambiguated because one of its hypernyms (kinds of associations), a tractor or machine, has a direct possessive link with a tractor tread. As this is the only semantic match, the word sense for cat meaning a tractor is retained. In the example WSD for "the boy's happy", three versions of the phrase are matched transformatively with the possible meanings of the word "'s", but only the meaning where "'s=is" does the disambiguation for the phrase resolve to a clause. For WBI, the system matches a number of patterns at the word level structurally within the text input including 'cath', 'he' and 'reads'. The matching of a higher-level phrase pattern that covers the entire input text is selected automatically as the best fit, which in this case resolves structurally to a full sentence. For PBI the same effect seen in WBI resolves PBI by selecting the longest, matching phrase: in this case a noun clause within a clause. While the phrase 'the cat hates the dog' is a valid phrase, its lack of coverage when compared with 'the cat hates the dog the girl fed' excludes it as the best choice.

Figure 6:
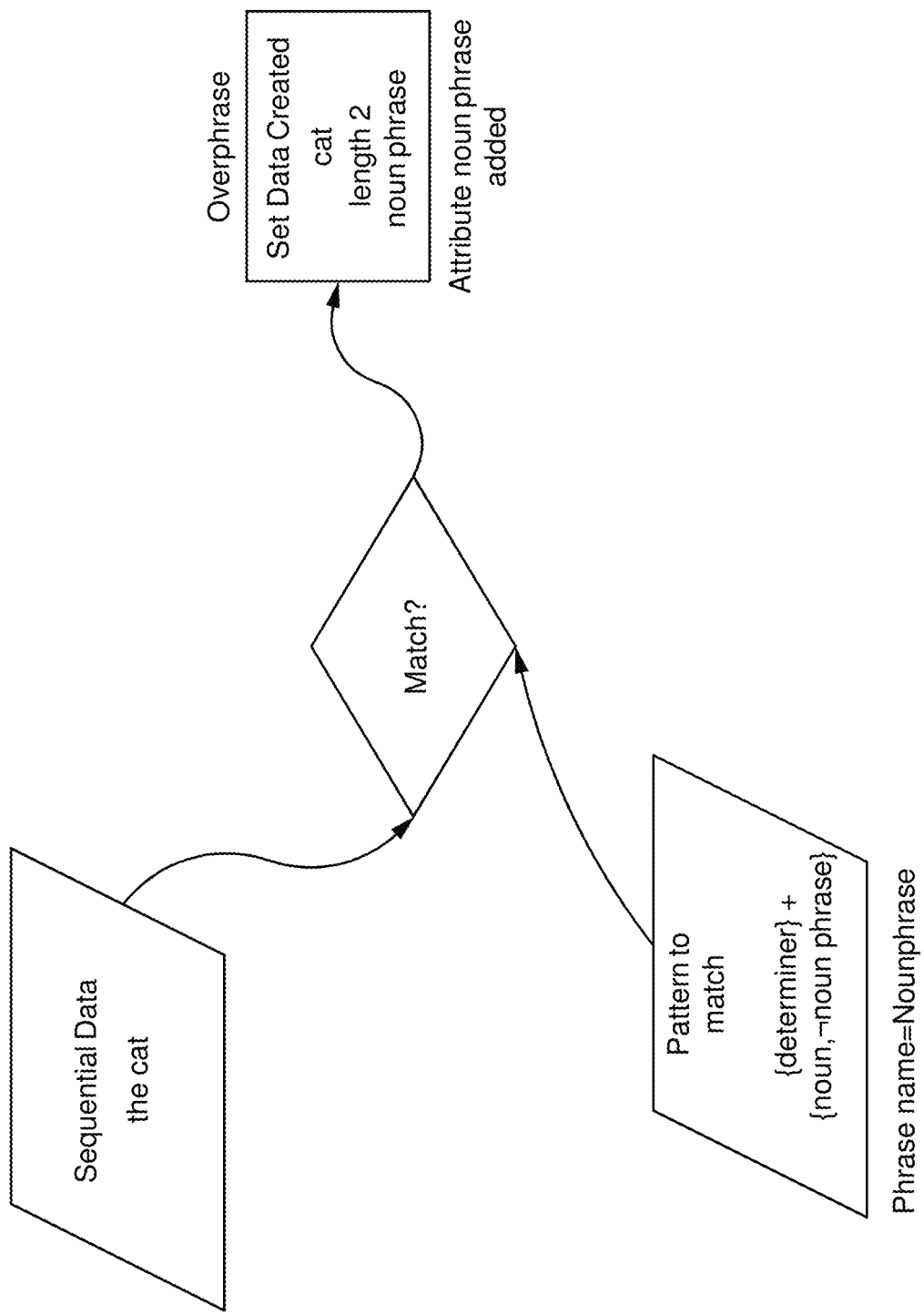
FIG. 6 shows an embodiment of the present invention in which a matched-pattern overphrase is assigned a new attribute.

FIG. 6 shows the computer-implemented process to match a sequential phrase pattern to input automatically after which the CS data structure stored fully represents the sequential pattern. The CS data structure reduces transformatively two elements to one. The two elements with text 'the cat' is replaced automatically by the head object 'cat' with a length of two and a new attribute called 'nounphrase'. The sequential phrase matched structurally has a length of two starting with a grammatical type of 'determiner' and followed by an element with a grammatical type of 'noun' but NOT an attribute of type 'nounphrase'. The inhibiting attribute 'nounphrase' is added automatically by this phrase data structure upon successful matching to inhibit electronically further inadvertent matching.

Figure 7:
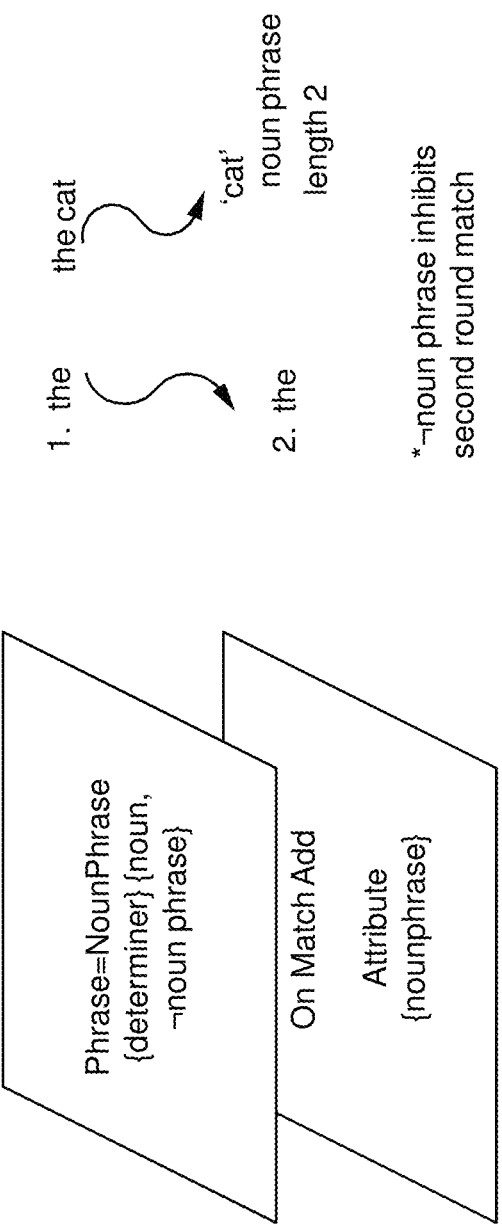
FIG. 7 shows how subsequent pattern-matches ignore the matched-pattern, effectively due to inhibition.

FIG. 7 illustrates how the phrase 'the the cat' is inhibited from matching the set created the second time around automatically because an element of the phrase inhibits the subsequent match. Because the phrase 'the cat' retains its head's grammatical type of noun structurally, it would match with another leading determiner if not constrained. This electronic inhibition has many applications, a key one of which structurally creates a logical level. Provided the attribute 'nounphrase' in this example is only added automatically to phrases without it, those with it must be at a logically higher structural level. These phrases can still be matched, of course, however the general transformative capability is highlighted. The result of matching 'the the' is necessary for a stutter for instance. Another attribute can be added to match 'the the' to 'the'+"attribute=duplicate", for example. In that case, the match would first incorporate 'the the' followed by the NounPhrase sequence.

Figure 8:
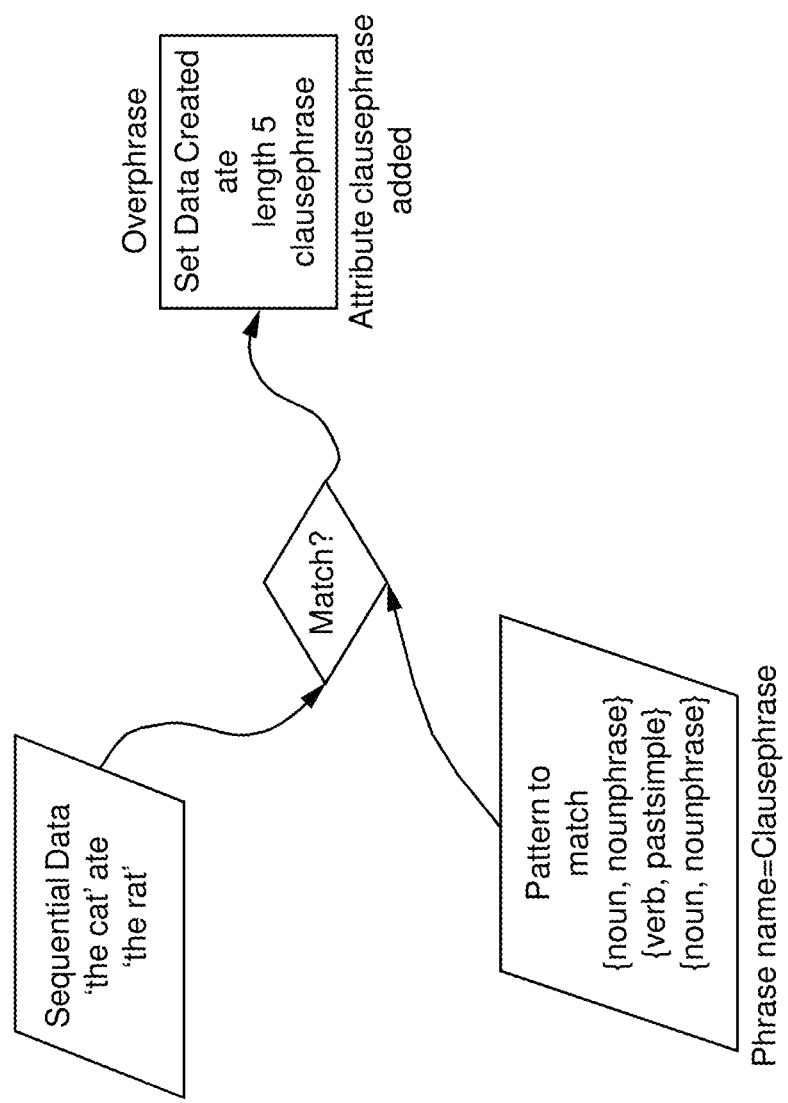
FIG. 8 shows how a pattern at another level makes use of the matched-pattern. The overphrase is a CS labelling the clause's predicate (per Role and Reference Grammar terminology) the PSA (privileged syntactic argument) and DCA (direct core argument). A subsequent pattern match can create the semantic representation in the SS.

FIG. 8 illustrates an additional layer in which clauses are matched structurally, but only once noun phrases have been matched. In the clausephrase shown, it is comprised of three data structure elements: the first is a noun with the attribute nounphrase, the second is a verb with the attribute past-simple and the third is also a noun with the attribute nounphrase. Provided the nounphrase attribute is only added by a successful match of such a phrase in any of its forms, the result will be to limit clauses automatically to only those that contain completed noun phrases.

Figure 9:
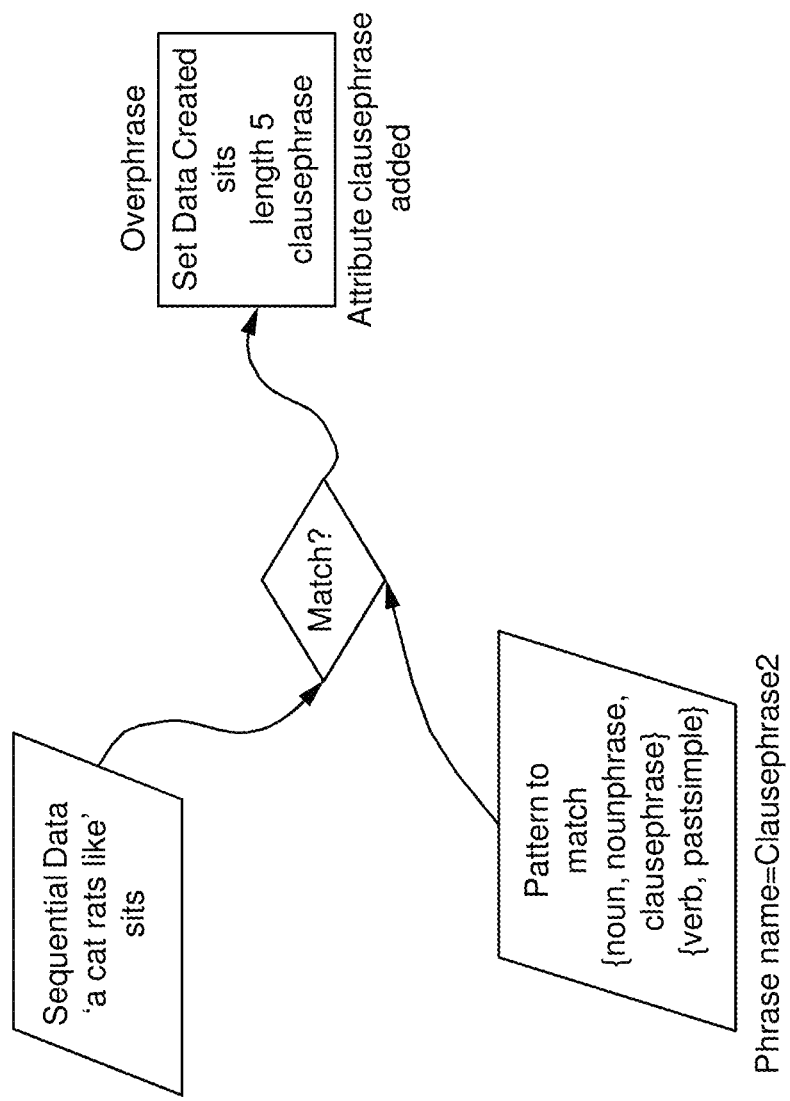
FIG. 9 illustrates how the repeated application of pattern matching results in the accumulation of complex, embedded patterns as a previously matched noun clause is matched in a clause. The CS here labels the PSA as 'a cat rats like' and the predicate as 'sits'.

FIG. 9 details another level of structural complexity. In English, the phrase 'a cat rats like' is a noun phrase in which the head (retained noun) for use in the sentence is 'a cat'. It has a meaning like the clause 'rats like a cat' but retains 'a cat' for use in the subsequent clause (the noun head is retained). In this example, 'a cat sits' is the resulting clause where it is also the case that 'rats like the cat' in question. On a linguistic note addressing pragmatic discourse, 'the cat' is required in my description to be clear that the intended meaning in the embedded clause refers to the same cat.

Figure 10:
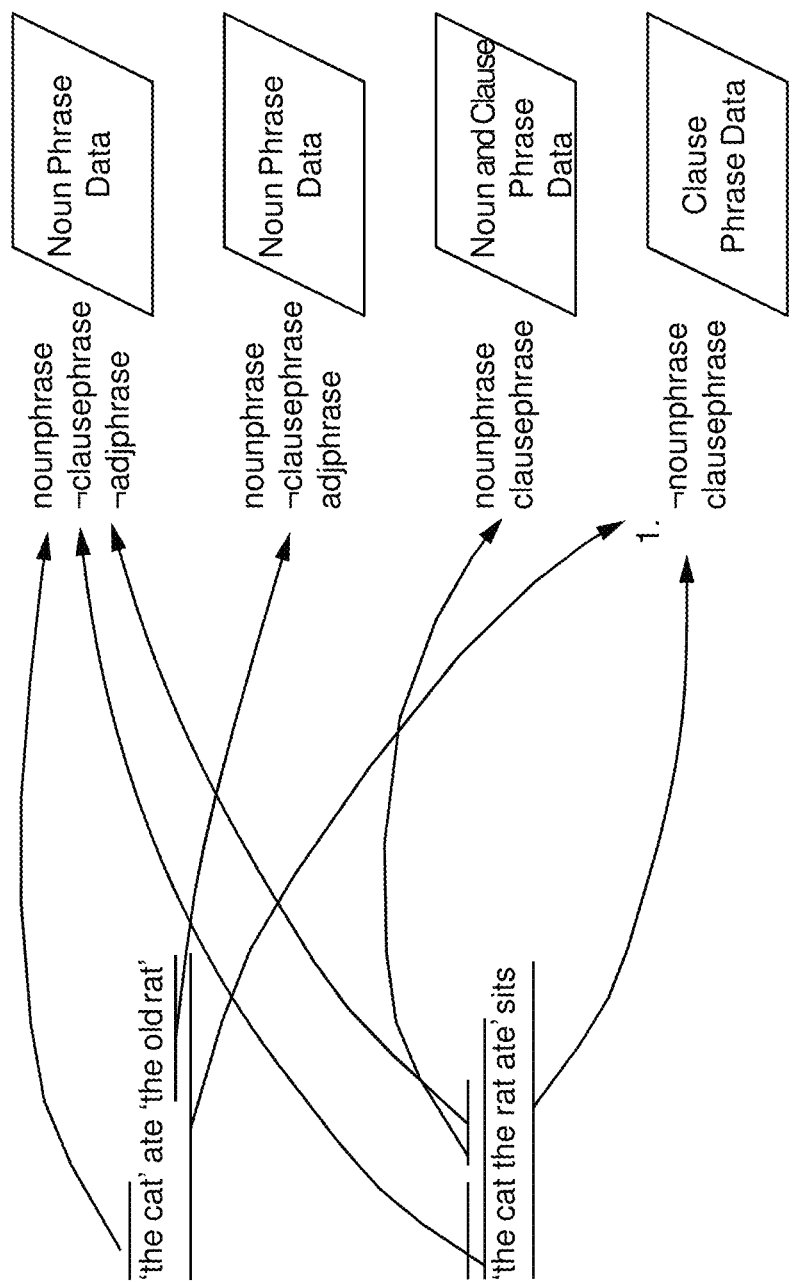
FIG. 10 shows the generation process to convert matched phrases back to sequential phrases or new set phrases to sequential form. As phrases are identified with sets of attributes, the attribute sets effectively form levels for the control of matching order and consolidation.

FIG. 10 shows the data structure pattern generation process using only set matching automatically to find correct sequential generation patterns: electronically generating sequential data structure patterns from a set of meaning. The model is bidirectional with the pattern matching from text to clause phrase data sets shown (i.e. a set of data structure elements that define a clause). To match 'the cat ate the old rat' automatically, first the noun phrases are matched by two different noun phrase data patterns and the attribute nounphrase added, with adjphrase if applicable. Next the nounphrases are matched in conjunction with the verb and its attributes structurally to identify the full clause. An embodiment of the present invention works in reverse for generation because each level can generate its constituents automatically in turn using only the same set matching process to find the sequential patterns to generate.

The matched phrase 'the cat ate the old rat' is generated into a sequence by first finding the set of data structure attributes electronically matching the full clause (labelled '1.') which is stored in a CS data structure. Generation uses the stored attributes automatically to identify appropriate phrase patterns. As '1.' {NOT nounphrase, clausephrase} matches the final clause, it provides structurally the template for generation: {noun plus nounphrase}, {verb plus past-tense}, {noun plus nounphrase}. Now each constituent of the matched clause identifies appropriate phrases for generation using their attributes transformatively to identify the correct target phrases. In this case one is without an embedded adjective{clausephrase, NOT adjphrase, nounphrase} and the other one has an embedded adjective{clausephrase, adjphrase, nounphrase}. When a specific word-sense is required, a word form is selected automatically that matches the previously matched version in the target language. There are no limitations on the number of attributes to match in the target pattern.

FAHQMT uses the filled CS data structure to generate transformatively into any language. The constituents of the CS data structure simply use target language phrases and target language vocabulary from the word senses. The use of language attributes stored with phrases and words to define their language limits possible phrases and vocabulary to the target language.

Figure 11:
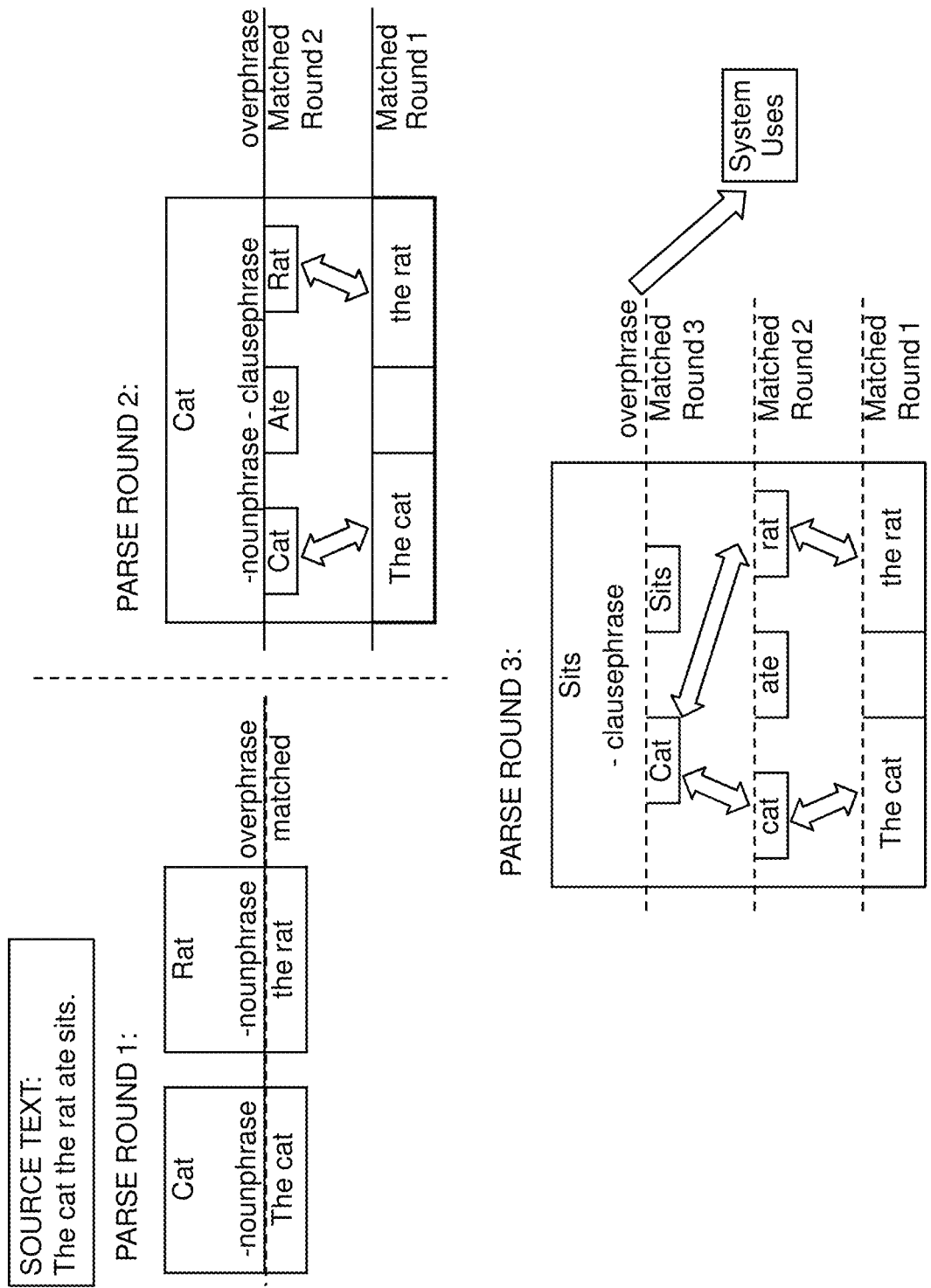
FIG. 11 shows the equivalence between text, a collection of sequential phrases and meaning, the consolidation of matched patterns from the completed parse. The creation of CSes that convert to semantic representations in SSes is used repeatedly in this simple example.

In FIG. 11, the matched phrase 'the cat the rat ate sits' similarly find a matching clause phrase and then generates each constituent automatically in turn based on its attributes, one of which is a noun-headed clause. The noun-headed clause will structurally generate embedded nouns using the appropriate converters based on their attributes. In practice, each matching and generating model is language specific, depending on its vocabulary and grammar learned through experience. The matches uses attributes in which phrases are matched in sequence until a full clause results. While the example, 'the cat the rat eats sits', matches noun phrases, then a noun clause, and then the full clause, an embodiment of the present invention caters automatically to any number of alternatives. The figure shows the automated matching sequence in which data structure patterns matched at one level become input for the subsequent matching round and other levels. By storing previously matched patterns within the LS, all data structure elements retain full access remains to all levels for subsequent matching.

The method of set-based parsing for automated linguistic analysis, explained using FIG. 1 to FIG. 11, is incorporated in a system (detail disclosed in FIG. 12B) comprising an NLU engine, a Context Engine and a Generation Engine, each including a processor and a memory unit. The memory stores one or more modules/set of instructions executable by the processor. In an embodiment, the conversational system is comprised of the three engines: NLU, Context and NLG. The NLU engine comprises a meaning matching module which takes input received and converts it to valid semantic output using a list set to store, match and use the words and their phrases to creates CS and SS. The Context engine takes the meaning produced (one of more SS) to determine if a change of context is required and determine a suitable response. The NLG engine takes meaning presented and converts it to the target language. It should be understood that although not shown, the conversational system could be used in conjunction with a computer system/server.

Figure 12A:
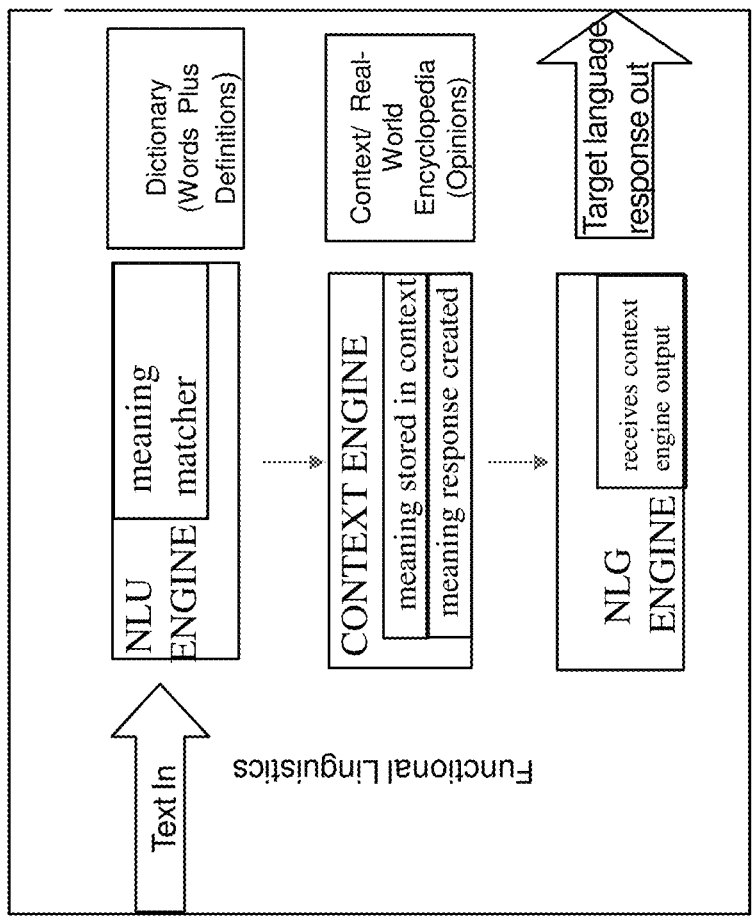
FIG. 12A is a model illustrating set based parsing for linguistics analysis according to one embodiment of the present invention. It relates the concepts of a dictionary and an encyclopedia to the engines driving the matching and generation processes in conversation.

FIG. 12A is a model illustrating set based parsing for linguistics analysis according to one embodiment of the present invention. In one embodiment, the system comprises an NLU, context and NLG engine. The system receives input comprising text and generates a corresponding text response in a specified, known target language. The NLU engine effectively operates like a dictionary, matching known definitions to their valid phrases in line with the RRG linguistic framework (semantically, predicates determine their arguments). The context engine tracks received meaning from the NLU and other contextual details (participants, locations, timeframes and so on) to effectively build up encyclopedic knowledge. As contextual meaning relates to its source, if is effectively opinion, never fact. The context engine resolves details that cannot be resolved by the meaning matcher, such as what is currently in context to resolve proforms. The NLG engine utilizes the meaning provided to it and the common access to the NLU dictionary to locate suitable phrases in the target language that matches the meaning provided, and then populate those phrases with corresponding vocabulary. NLG relies on target word meanings to determine appropriate target language syntax and word forms. This approach is language-independent as the dictionary definitions and context are stored with semantic content only. NLU uses the words provided to access potential phrases in that word's language—implementing the grammar of that language. Similarly, the target language's words and phrases can be sufficient for NLG as potential word orders and word forms are language-specific. The Consolidation Set (CS) collects the syntactic labels necessary for a Semantic Set to be created, with semantic validation from the predicates. The Meaning Matcher (Meaning Matching Module) outputs sets (SS) with a semantic representation. The Context Engine converts the semantic representation to a response meaning for a targeted language response output by a Generator (NLG). The state-of-the-art statistical and neural network translation systems do not operate independently of the source and target languages, and therefore cannot rely on human-like context. While passing the output of the NLU to the NLG would seem possible, accuracy is not possible as proforms may not be correctly resolved between languages due to lack of clarity needed for the target language. FAHQMT requires a context engine.

In one embodiment, the NLU comprises a meaning matcher and a distinct context engine for generating a validated meaning/semantic representation from matched patterns and a meaning response, respectively. In other embodiments, the NLU may just comprise a meaning matcher, while the context engine may be independent, yet in communication with the NLU and meaning matcher. In yet other embodiments, the NLU as a single entity may wholly perform the functions of the meaning matcher and context engine without structural distinctions.

Figure 12B:
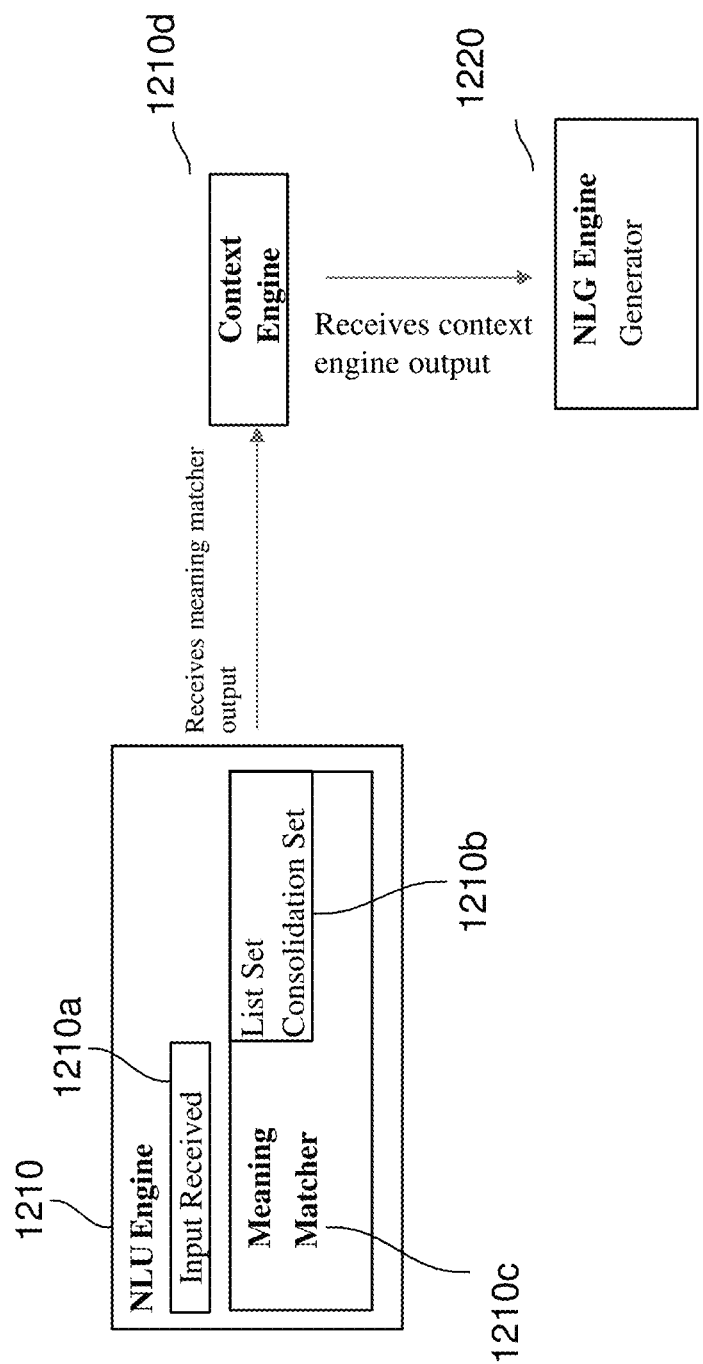
FIG. 12B is a block diagram of a system to implement set-based parsing for linguistics analysis according to an embodiment of the present invention.

FIG. 12B is a block diagram of a system to implement set-based parsing for linguistics analysis according to an embodiment of the present invention. The system comprises NLU engine 1210 including an input API for text or other encoded input and a meaning matcher to convert the input to its meaning. 1210c, the meaning matcher (meaning matching module), uses List Sets to create and track Consolidations Sets of syntax and Semantic Sets of validated meaning, 1210b. The meaning matcher can be a processor coupled to a memory element with stored instructions. The NLU engine further comprises an input module to receive input 1210a comprising symbols that may be matched to known words. In one embodiment, the received input further comprises at least one of a sound feature, written character, letter or symbols, phrase representing a collection of elements, clauses, sentences, and stories. The semantic-based NLU input processing system as a whole comprises a meaning matcher 1210c; a context engine 1210d; a generator 1220; a processor coupled to a memory element with stored instructions, when implemented by the processor, cause the processor to receive input; convert symbols into known words (using word-level patterns); convert words into phrases (using phrase-level patterns), wherein phrases can be syntactic patterns which form a consolidation set (CS) to reduce the combinations possible compared to rules-based methods; convert the CS into a semantic representation by the meaning matcher 1210c, validating meaning at the same time and wherein invalid meanings are not stored; convert the semantic representation received into a meaning response by the context engine 1210d; and generate a target language response by the generator 1220.

The semantic-based NLU input processing system as a whole comprises a meaning matcher 1210c; a context engine

1210*d*; a generator 1220; a processor coupled to a memory element with stored instructions, when implemented by the processor, cause the processor to filter the received input into a stored set parsing at least one of the words or patterns into at least one kind of semantic category such as the attributes of actor, position, predicate, goal, or question. The List Set (LS) from FIG. 12B allows the storage of words, phrases, CS and SS as workspace for the number of symbols received.

The NLU is further configured to receive at least a second input including a question, whose form is determined by the source language. The context engine receives semantically labelled elements, related by predicates. Hierarchical matching occurs until no new matches are made. The generator 1220 is configured to a response to the question for machine interface 1230. The response comprises at least one of a natural language voice response, textual response, form-fill, signal activation, computational processing, or peripheral device actuation. The NLU engine 1210 is configured to embed a tag to at least one of the matched attributes for subsequent matching, matched to a new logical level until no new matches are stored after a full matching round. The generation of a response to the question for machine interface, comprising at least one of a natural language voice response, textual response, form-fill, signal activation, computational processing, or peripheral device actuation, is via an API integration.

The semantic-based NLU input processing system based on a bi-directional linkset pattern matching across logical levels for machine interface comprises: a meaning matcher 1210*c*; a context engine 1210*d*; a generator 1220; a processor coupled to a memory element with stored instructions, when implemented by the processor, cause: receiving at least a first input; applying a consolidation to convert symbols into words and words into phrase patterns, pattern match to convert phrase patterns into validated meanings; converting the validated meanings into a semantic representation by the meaning matcher 1210*c*; converting the semantic representation into a meaning response by the context engine 1210*d*; and finally, generating a targeted language response by the generator 1220.

The NLU Engine 1210 comprises the meaning matcher 1210*c*. In a preferred embodiment, the meaning matcher 1210*c* converts words to phrases; creates consolidation sets from those phrase patterns; and those consolidation sets are then converted into a semantic representation (SS). The output from the meaning matcher 1210*c* (semantic representation) is received by the context engine 1210*d*. As shown, it is a distinct module from the meaning matcher 1210*c*/NLU 1210. However, in other embodiments, they may be integrated as a single module/engine. In a preferred embodiment, the context engine 1210*d* resolves meaning in context; adds context if no questions; and answers questions with meaning. The NLG Engine or generator 1220 receives the output of the context engine 1210*d* and converts the meaning response into a targeted language meaning response based on settings from the context engine 1210*d* output.

The system further comprises an Automatic Speech Recognition (ASR) component, wherein the ASR comprises pattern matching to process the received input, wherein such analysis automatically finds at least one sentence comprising a plurality of disambiguated words. The system further comprises an Interactive Voice Response (IVR) component to process the accessed received input for said pattern matching, wherein a processor further uses said IVR component automatically to generate at least one response associated with another received input associated with at least one reverse pattern in a structure hierarchy of such other received input.

The system further comprises a Natural Language Processing (NLP) component, wherein the NLP comprises pattern matching to process the accessed received input, wherein such analysis automatically finds at least one sentence comprising a plurality of disambiguated words. The system further comprises a Fully Automatic High Quality Machine Translation (FAHQMT) component and the NLP component to process the accessed received input, wherein such analysis automatically resolves at least one phrase to unambiguous content and generation using response capability of an Interactive Voice Response (IVR) component for voice or text-based response. The system is further configured to process a voice-based data structure sequence to recognize at least one disambiguated word while processing at least one accent according to one or more attribute limiter.

Pattern matching starts at the first word and finish at the last word and continues until no matches are found. The matched patters are converted into meanings. The system is configured to intersect matched meanings with current context, which is a collection of previously identified meanings. In one embodiment, the meaning is determined through a combination of at least two of a dictionary definition layer, encyclopedic layer, and a contextual layer. The contextual layer derives meaning of a word in a list by accepting the output of the meaning matcher, which comprises one or more SS elements, such as (actor, undergoer, predicate, when, where, why, etc.) and a set of attributes such as (statement/question, positive/negative, tense—past/present, aspect—perfect/progressive/both, voice—active/passive, etc.) and by intersecting potential meanings with other stored meanings in this layer to produce what is known as context.

Figure 13A:
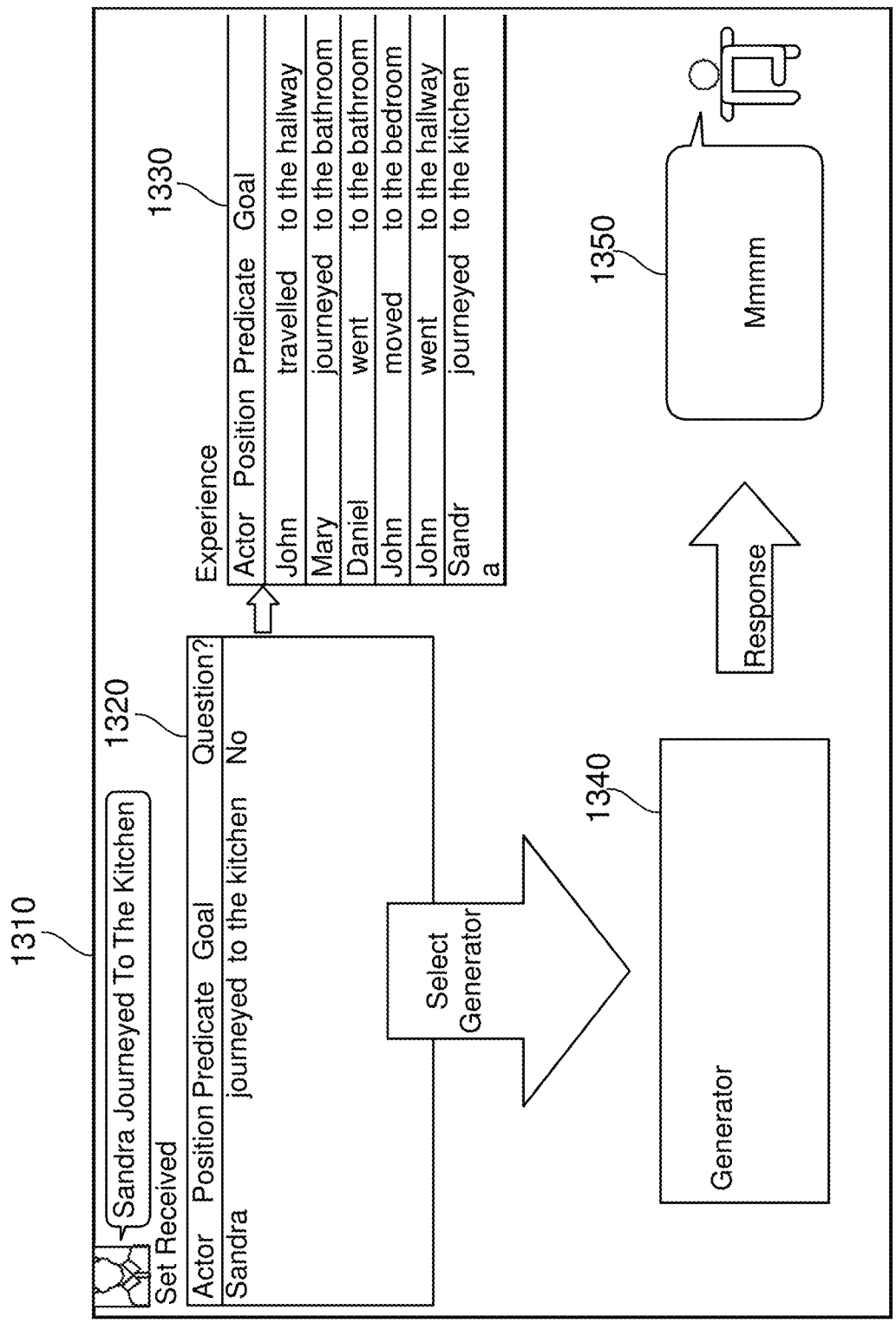
FIG. 13A is a process of generating response to an input comprising a statement (of one or more words) to be added to context, which is explained with an example according to an embodiment of the present invention. A response to a statement adding context is somewhat trivial, obviously.
Figure 13B:
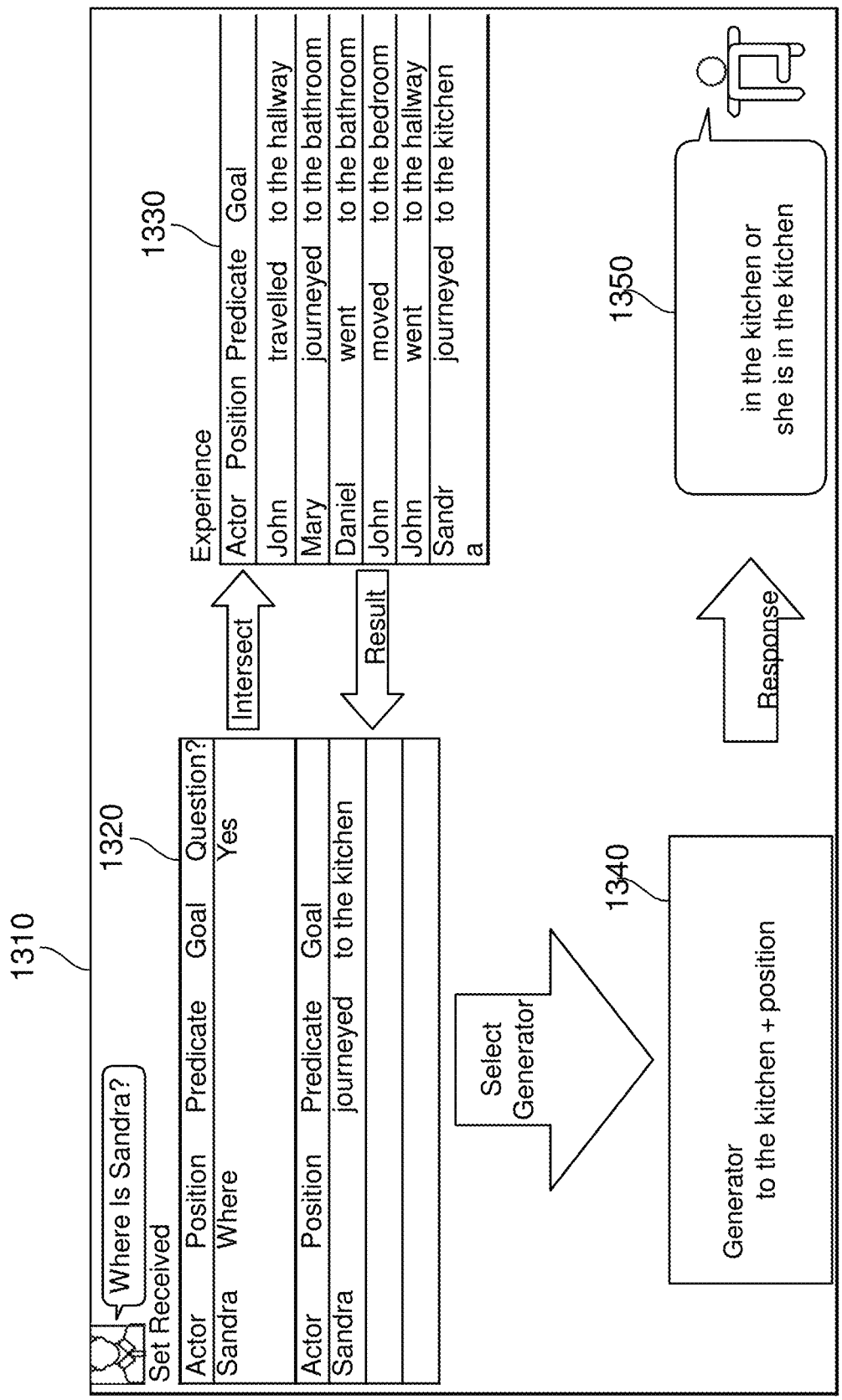
FIG. 13B is the process of generating a response to an input comprising a question, which is explained with an example according to another embodiment of the present invention. Intersecting the current context provides the short list for a response.

FIG. 13A is a process 1310 of generating response to an input statement or command comprising at least one word, which is explained with an example according to an embodiment of the present invention. At the input module an input 1320 comprising at least one of word is received. The input 1320 comprises words "Sandra journeyed to the kitchen". The NLU converts this to actor=Sandra, predicate=journeyed, goal='to the kitchen' with the statement attribute set. Experience (the context engine) will store the meaning of this input to complete the NLU and Context engine role. The context engine's response to a statement is to acknowledge. The generator 1340 receives the acknowledgement indication and provides a response 1350 "mmm" FIG. 13B is the process 1310 of generating a correct, known response to a question, which is explained with an example according to another embodiment of the present invention. At the input module 1320 a question is received. The input 1320 comprises words "where is Sandra". The NLU converts this to role=Sandra, question=where. A role can match any stored context comprising the same referent. The context engine intersects the meaning input to find one match, that entered in FIG. 13A. The generator 1340 receives actor=Sandra, predicate journeyed, goal='to the kitchen', question=where, and predicate=position from 1330. The generator then provides a response 1350 "in the kitchen or she is in the kitchen" as valid answers to the input question by, in the shorter case 'in the kitchen', generating the target language phrase for position, and then populating it with the meaning of 'to', and the reference phrase 'kitchen' definition.

Figure 14:
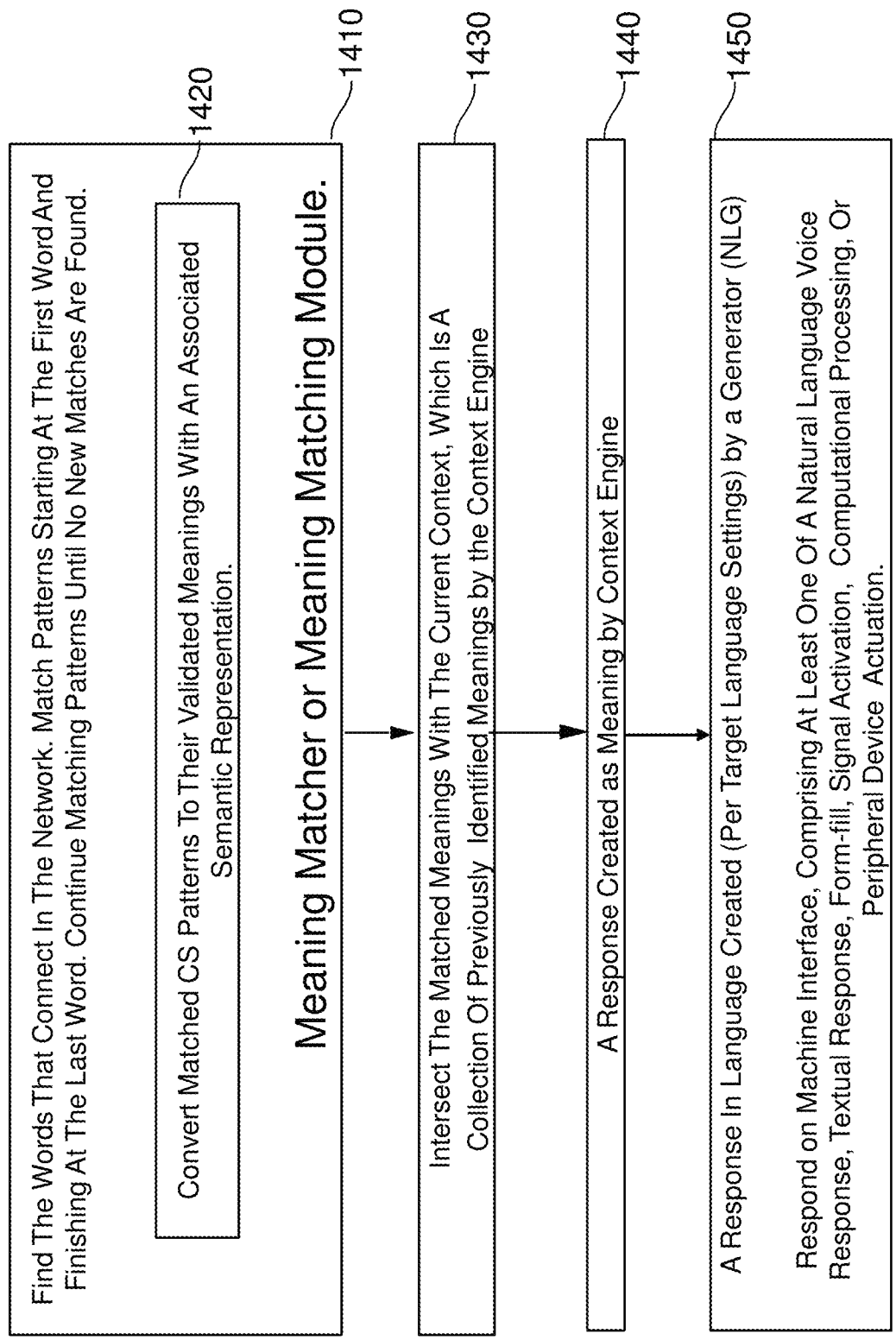
FIG. 14 is a method flow illustrating a process of determination of meaning for a received input in an embodiment of the present invention.
Figure 17:
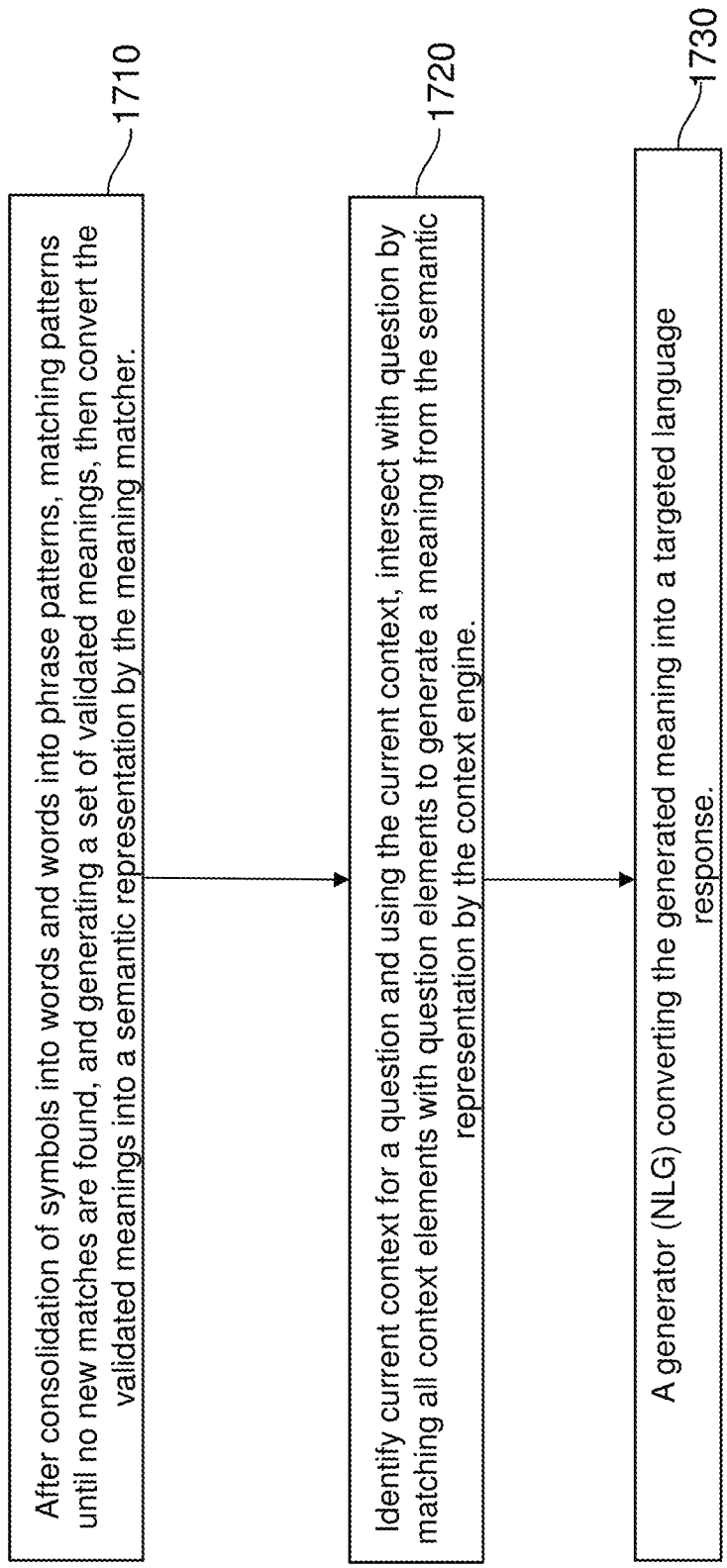
FIG. 17 is a method flow illustrating a process for converting a generated meaning response into a targeted language response.

FIG. 14 and FIG. 17 is a method flow illustrating a process of determination of meaning for a received input in an embodiment of the present invention. At step 1410, in response to the input, words are found in the network for pattern matching. Match patterns starts at the first word and finishes at the last word. Further, matching patterns are continued until no new matches are found. The system has been implemented to show that a single algorithm matching patterns can deal with a wide range of problems that on the surface look to be radically different. At step 1420, 1710 matched patterns are converted to their meanings. Convert matched patterns to their validated meanings. Generate an associated semantic representation by a meaning matcher (meaning matching module). At step 1430, 1720 the matched meanings are intersected with the current context, which is a collection of previously identified meanings. The NLU identifies current context for a question and using the current context, intersect with question by matching all context elements with question elements to generate a meaning from the semantic representation by the context engine. In step 1440, 1730 a generator (NLG) converts the generated meaning response into a targeted language response. Alternatively, The NLU identifies current context for a question and using the identified current context, intersect with question by matching all context elements with question elements to generate a semantic representation by the meaning matcher, which in turn converts to a generated meaning response by the context engine, and finally converts into a selected language meaning response by the generator (NLG).

In a preferred embodiment, the semantic-based NLU input processing method comprises the steps of: (1) receiving input; (2) converting symbols into known words (using word-level patterns); (3) converting words into phrases (using phrase-level patterns), wherein phrases can be syntactic patterns which forth a consolidation set (CS) to reduce the combinations possible compared to rules-based methods; (4) converting the CS into a semantic representation (SS) by a meaning matcher, validating meaning at the same titre and wherein invalid meanings are not stored; (5) converting the semantic representation received into a t caning response by a context engine; and (6) generating a target language response by the generator.

Figure 15:
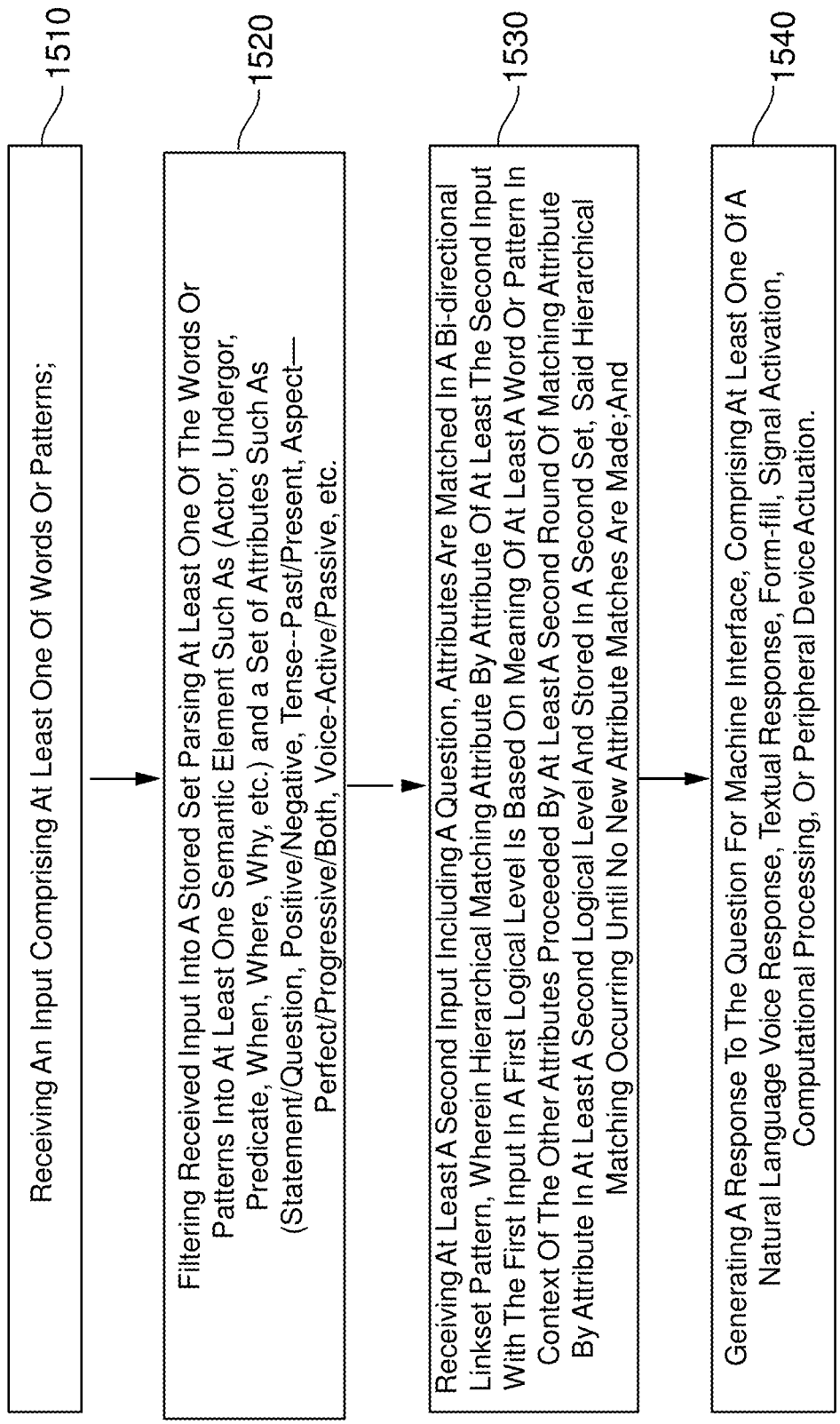
FIG. 15 is a method flow illustrating a semantic-based NLU input processing method based on a bi-directional linkset pattern matching across logical levels for machine interface, in an embodiment of the present invention.
Figure 16:
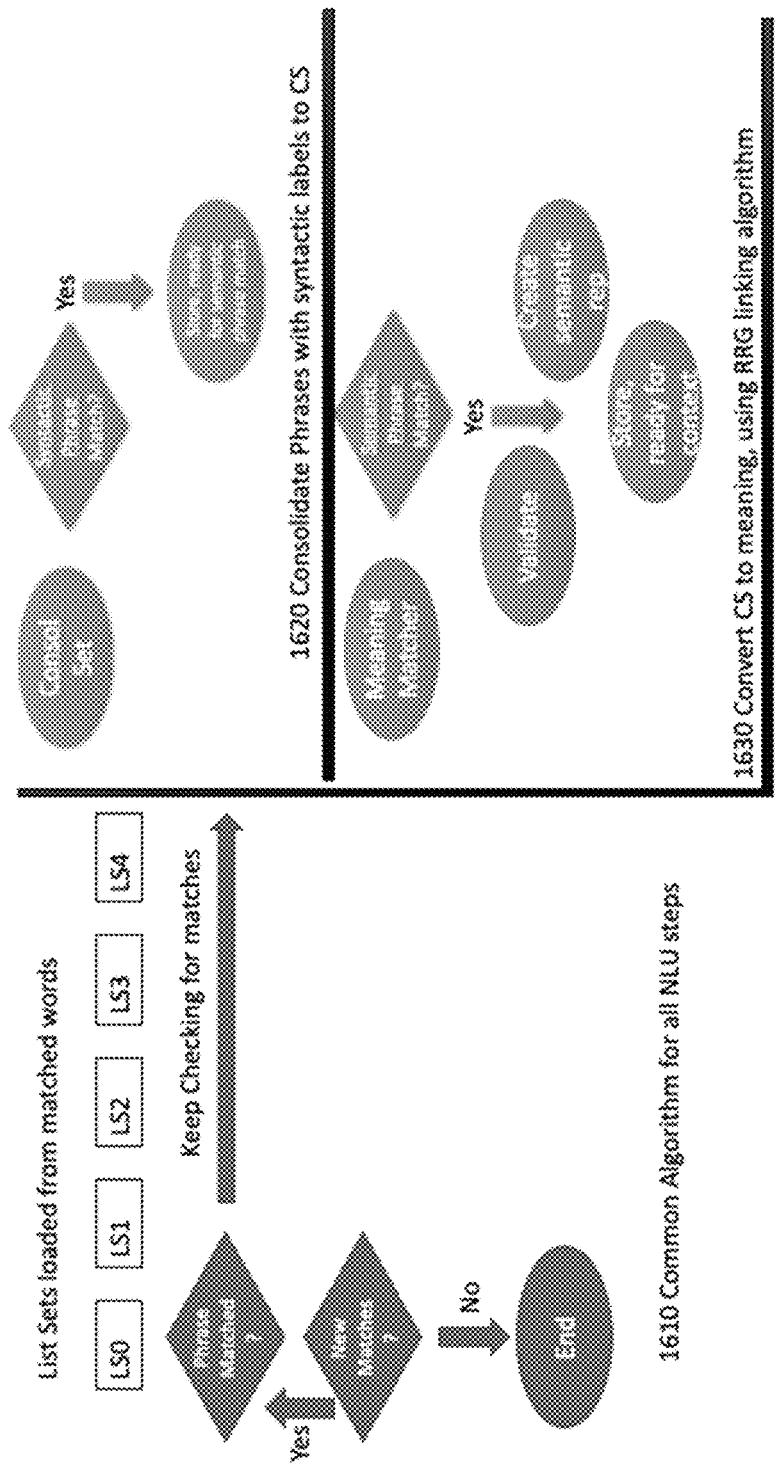
FIG. 16 is a process of converting a consolidation set to a validated meaning and a semantic representation for generating a meaning response.

FIG. 15 and FIG. 16 is a flowchart illustrating a semantic-based NLU input processing method based on a bi-directional linkset pattern matching across logical levels for machine interface, in an embodiment of the present invention. The semantic-based NLU input processing method is incorporated in a system comprising a meaning matcher, a context engine, a generator, and a processor coupled to a memory element with stored instructions. The method includes a step 1510 of receiving an input comprising at least one of words or patterns. The method further includes a step 1520, 1610 of: filtering received input into a stored set parsing at least one of the words or patterns into at least one semantic element such as (actor, undergoer, predicate, when, where, why, etc.) and a set of attributes such as (statement/ question, positive/negative, tense—past/present, aspect— perfect/progressive/both, voice—active/passive, etc.) The method further includes a step 1530, 1620, 1630 of receiving at least a second input including a question, attributes are matched in a bi-directional linkset pattern, wherein hierarchical matching attribute by attribute of at least the second input with the first input in a first logical level is based on meaning of at least a word or pattern in context of the other attributes proceeded by at least a second round of matching attribute by attribute in at least a second logical level and stored in a second set. The hierarchical matching occurring until no new attribute matches are made. The method further includes a step 1540 of generating a response to the question for machine interface, comprising at least one of a natural language voice response, textual response, form-fill, signal activation, computational processing, or peripheral device actuation.

The system is described as a hardware, firmware and/or software implementation that can run on one or more personal computer, an internet or datacenter based server, portable devices like phones and tablets and most other digital signal processor or processing devices. By running the software or equivalent firmware and/or hardware structural functionality on an internet, network, or other cloud-based server, the server can provide the functionality while at least one client can access the results for further use remotely. In addition to running on a current computer device, it can be implemented on purpose built hardware, such as reconfigurable logic circuits.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

I claim:

1. A natural language processing system with split syntactical and semantic parsing, said system comprising:
   a natural language understanding engine with a meaning matcher module;
   a context engine;
   a generation engine;
   one or more processors coupled to one or more memory elements with stored instructions which, when executed by the one or more processors:
   (i) cause the natural language understanding engine to:
   receive an input;
   store a set of known words in the input as a set of elements in a list set;
   conduct syntactical parsing by:
      matching at least one element from the set of elements in the list set against known phrases by searching a dictionary of the known phrases using the at least one element; and
      storing, in the list set and as a consolidation set, if a match with the at least one element was found, the at least one element along with at least one syntactic label; and
   conduct semantic parsing by:
      matching at least one consolidation set from the list set against known semantic phrases by searching a dictionary of the known semantic phrases using the at least one consolidation set;

validating a meaning of the at least one consolidation set by: (i) testing potential senses for the words in the input, associated with the at least one consolidation set, for consistency; and (ii) discarding potential senses based on a word sense disambiguation analysis; and storing, in the list set and as a semantic set, if a match with the at least one consolidation set was found and the meaning was validated, the at least one consolidation set along with at least one semantic label;

whereby the meaning matching module converts the input to a valid semantic output;

(ii) cause the context engine to determine that a change of context is required using the valid semantic output; and Gil) cause the generation engine to generate a response to the input based on the change of context.

2. The system of claim 1, wherein the syntactic label is an attribute that is assigned to the consolidation set for subsequent matching.

3. The system of claim 1, wherein the input comprises at least one of a sound feature, a written character, a letter, a symbol, and a phrase representing a collection of semantic elements.

4. The system of claim 1, wherein the list set is a list of one or more symbols, one or more words, or one or more phrases that connect to a set of associations to form a list of sets of elements.

5. The system of claim 1, wherein: the consolidation set is matched using the at least one syntactic label; and the semantic set is on a new logical level from a logic level of the consolidation set.

6. The system of claim 1, further comprising an Automatic Speech Recognition (ASR) component, wherein the ASR comprises pattern matching to process the input, and wherein the pattern matching automatically finds at least one sentence comprising the set of known words.

7. The system of claim 1, further comprising a Natural Language Processing (NLP) component, wherein the NLP comprises pattern matching to process the input, and wherein the pattern matching automatically finds at least one sentence comprising the set of known words.

8. The system of claim 1, wherein the stored instructions, when executed by the one or more processors cause the system to: process a voice-based data structure sequence to recognize at least one disambiguated word while processing at least one accent according to one or more attribute limiter, wherein the input is the voice-based data structure and the at least one disambiguated word is at least one known word in the set of known words in the input.

9. The system of claim 1, wherein: the matching for the syntactical parsing and the matching for the semantic parsing start at the first element and finish at the last element in the list set and match patterns until no new matches are found.

10. The system of claim 9, wherein the step of validating meanings is conducted through a combination of at least one of a dictionary definition layer, encyclopedic layer, or a contextual layer.

11. The system of claim 10, wherein the semantic label is at least one of an actor, an undergoer, a position, a predicate, and a goal.

12. A natural language processing method, in which each step is computer-implemented, comprising:
(i) using a natural language understanding engine with a meaning matcher module to:
receive an input;
store a set of known words in the input as a set of elements in a list set;
conduct syntactical parsing by:
    matching at least one element from the set of elements in the list set against known phrases by searching a dictionary of the known phrases using the at least one element; and
    storing, in the list set and as a consolidation set, if a match with the at least one element is found in the dictionary, the at least one element along with at least one syntactic label; and
conduct semantic parsing by:
    matching at least one consolidation set, from the list set against known semantic phrases by searching a dictionary of the known semantic phrases using the at least one consolidation set;
    validating a meaning of the at least one consolidation set by: (i) testing potential senses for the words in the input, associated with the at least one consolidation set, for consistency; and (ii) discarding potential senses based on word sense disambiguation analysis; and
    storing, in the list set and as a semantic set, if a match with the at least one consolidation set was found and the meaning was validated, the at least one consolidation set along with at least one semantic label;
    whereby the meaning matching module converts the input to a valid semantic output;
(ii) using a context engine to determine that a change of context is required using the valid semantic output; and
(iii) using a generation engine to generate a response to the input based on the change of context.

* * * * *

UNITED STATES PATENT AND TRADEMARK OFFICE
CERTIFICATE OF CORRECTION

PATENT NO. : 11,955,115 B2  
APPLICATION NO. : 16/255011  
DATED : April 9, 2024  
INVENTOR(S) : John Ball Page 1 of 1

It is certified that error appears in the above-identified patent and that said Letters Patent is hereby corrected as shown below:

In the Claims

In Column 17, Line 17, Claim No. 1:  
Change "Gil) cause the generation engine to generate a response to"  
To --(iii) cause the generation engine to generate a response to--

Signed and Sealed this  
Nineteenth Day of November, 2024

Katherine Kelly Vidal  
*Director of the United States Patent and Trademark Office*